(12) United States Patent
Baird et al.

(10) Patent No.: US 9,663,729 B2
(45) Date of Patent: May 30, 2017

(54) METHODS AND FUEL PROCESSING APPARATUSES FOR UPGRADING A PYROLYSIS OIL STREAM AND A HYDROCARBON STREAM

(75) Inventors: Lance Awender Baird, Prospect Heights, IL (US); Paolo Palmas, Des Plaines, IL (US); Sathit Kulprathipanja, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 836 days.

(21) Appl. No.: 13/563,172

(22) Filed: Jul. 31, 2012

(65) Prior Publication Data

US 2014/0034550 A1    Feb. 6, 2014

(51) Int. Cl.
*C10G 51/04*     (2006.01)
*C10G 11/18*     (2006.01)
*B01J 4/00*      (2006.01)

(52) U.S. Cl.
CPC .............. *C10G 51/04* (2013.01); *B01J 4/002* (2013.01); *C10G 11/18* (2013.01); *C10G 11/187* (2013.01); *B01J 2204/002* (2013.01); *B01J 2204/007* (2013.01); *C10G 2300/1011* (2013.01); *C10G 2300/1074* (2013.01); *C10G 2300/4006* (2013.01); *Y02P 30/20* (2015.11)

(58) Field of Classification Search
CPC ..... C10G 11/18; C10G 11/182; C10G 11/187; C10G 51/04
See application file for complete search history.

(56) References Cited

U.S. PATENT DOCUMENTS

| | | | |
|---|---|---|---|
| 5,346,133 A | * | 9/1994 | Bogner et al. ............. 239/132.3 |
| 6,627,161 B1 | | 9/2003 | Radcliffe et al. |
| 6,936,227 B1 | | 8/2005 | De Souza et al. |
| 2004/0251166 A1 | * | 12/2004 | Alvarenga Baptista et al. .............................. 208/78 |
| 2006/0222555 A1 | | 10/2006 | Herrera et al. |
| 2007/0227874 A1 | * | 10/2007 | Wolf-Eberhard et al. ...... 202/84 |
| 2009/0095651 A1 | | 4/2009 | Leonard |

(Continued)

FOREIGN PATENT DOCUMENTS

| | | |
|---|---|---|
| GB | 2447684 A | 9/2008 |
| RU | 2010107891 A | 9/2011 |

(Continued)

OTHER PUBLICATIONS

International Search Report for PCT/US2013/040879, mailing date Nov. 14, 2013.

(Continued)

*Primary Examiner* — Renee Robinson

(57) ABSTRACT

Methods and apparatuses for upgrading a pyrolysis oil stream and a hydrocarbon stream are provided herein. In an embodiment, a method for upgrading a pyrolysis oil stream and a hydrocarbon stream includes separately introducing the pyrolysis oil stream and the hydrocarbon stream into a reaction zone to form a mixture of the pyrolysis oil stream and the hydrocarbon stream in the reaction zone. The mixture of the pyrolysis oil stream and the hydrocarbon stream is catalytically cracked in the presence of a particulate cracking catalyst in the reaction zone. The pyrolysis oil stream is maintained at a temperature of less than or equal to about 100° C. substantially up to introduction into the reaction zone.

19 Claims, 2 Drawing Sheets

(56) References Cited

U.S. PATENT DOCUMENTS

| | | |
|---|---|---|
| 2010/0083566 A1* | 4/2010 | Fredriksen et al. ............ 44/354 |
| 2010/0222620 A1 | 9/2010 | O'Connor et al. |
| 2011/0083997 A1 | 4/2011 | Silva |
| 2012/0160741 A1* | 6/2012 | Gong et al. .................. 208/113 |
| 2012/0216448 A1* | 8/2012 | Ramirez Corredores et al. .............................. 44/307 |

FOREIGN PATENT DOCUMENTS

| | | | |
|---|---|---|---|
| WO | 2011053166 A1 | 5/2011 | |
| WO | WO 2011/053166 | * 5/2011 | .............. C10G 1/00 |
| WO | 2011090606 A2 | 7/2011 | |
| WO | 2012062924 A1 | 5/2012 | |
| WO | 2012092468 A1 | 5/2012 | |

OTHER PUBLICATIONS

Marker, Terry, et al., "Opportunities for Biorenewables in Oil Refineries Final Technical Report," Submitted to: U.S. Department of Energy, Publication Date: Dec. 12, 2005.

Fogassy, et al., "Biomass Derived Feedstock Co-Processing With Vacuum Gas Oil for Second-Generation Fuel Production in FCC Units," Applied Catalysis B: Environmental, v 96, n 3-4, p. 476-485, Jun. 7, 2010.

de Miguel Mercader, et al., "Production of Advanced Biofuels: Co-Processing of Upgraded Pyrolysis Oil in Standard Refinery Units," Applied Catalysis B: Environmental, v 96, n 1-2, p. 57-66, Apr. 26, 2010.

Schuurman, et al., "Co-Processing in FCC Units: Catalytic Co-Cracking of Hydrocarbons and Oxygenated Biomass Compounds," ACS National Meeting Book of Abstracts, 2007 Conference: 234th ACS National Meeting, Aug. 19, 2007-Aug. 23, 2007.

Graca, et al., "Catalytic Cracking of Mixtures of Model Bio-Oil Compounds and Gasoil," Applied Catalysis B: Environmental, v 90, n 3/4, p. 556-563, Aug. 17, 2009.

Bertero, et al., "Effect of Pyrolysis Temperature and Thermal Conditioning on the Coke-Forming Potential of Bio-Oils," Energy and Fuels, v 25, n 3, p. 1267-1275, Mar. 17, 2011.

Lu Q et al: "Overview of fuel properties of biomass fast pyrolysis oils", Energy Conversion and Management, Elsevier Science Publishers, Oxford, GB., vol. 50, No. 5 May 1, 2009, pp. 1376-1383.

Zhang et al: "Review of biomass pyrolysis oil properties and upgrading research". Energy Conversion and Management, Elsevier Science Publishers, Oxford, GB, vol. 48, No. 1, Jan. 1, 2007, pp. 87-92.

EP Search Report dated Mar. 9, 2016 for corresponding PCT Application No. PCT/US2013040879.

* cited by examiner

METHODS AND FUEL PROCESSING APPARATUSES FOR UPGRADING A PYROLYSIS OIL STREAM AND A HYDROCARBON STREAM

TECHNICAL FIELD

The technical field generally relates to methods and fuel processing apparatuses for upgrading a pyrolysis oil stream and a hydrocarbon stream. More particularly, the technical field relates to methods and fuel processing apparatuses for catalytically cracking a mixture of a pyrolysis oil stream and a hydrocarbon stream.

BACKGROUND

Fluid catalytic cracking (FCC) is a well-known process for the conversion of relatively high boiling point hydrocarbons to lower boiling point hydrocarbons in the heating oil or gasoline range. Such processes are commonly referred to in the art as "upgrading" processes. To conduct FCC processes, FCC units are generally provided that have one or more reaction zones, with a hydrocarbon stream contacted in the one or more reaction zones with a particulate cracking catalyst. The particulate cracking catalyst is maintained in a fluidized state under conditions that are suitable for the conversion of the relatively high boiling point hydrocarbons to lower boiling point hydrocarbons.

While hydrocarbon streams such as vacuum gas oil, reduced crude, or other petroleum-based sources of hydrocarbons have commonly been upgraded through FCC processes, there is a general desire to upgrade biofuels along with the hydrocarbon streams in the FCC processes. By upgrading biofuel along with the hydrocarbon streams, the resulting upgraded fuel includes a renewable content and enables net petroleum-based hydrocarbon content of the upgraded fuel to be decreased.

Biofuels encompass various types of combustible fuels that are derived from organic biomass, and one particular type of biofuel is pyrolysis oil, which is also commonly referred to as biomass-derived pyrolysis oil. Pyrolysis oil is produced through pyrolysis, including through recently-developed fast pyrolysis processes. Fast pyrolysis is a process during which organic biomass, such as wood waste, agricultural waste, etc., is rapidly heated to about 450° C. to about 600° C. in the absence of air using a pyrolysis unit. Under these conditions, a pyrolysis vapor stream including organic vapors, water vapor, and pyrolysis gases is produced, along with char (which includes ash and combustible hydrocarbon solids). A portion of the pyrolysis vapor stream is condensed in a condensing system to produce a pyrolysis oil stream. Pyrolysis oil is a complex, highly oxygenated organic liquid that typically contains about 20-30% by weight water with high acidity (TAN>150).

Due to the high oxygen content of the pyrolysis oils, pyrolysis oils are generally immiscible with hydrocarbon streams. Prior attempts to co-process pyrolysis oil streams and hydrocarbon streams have involved deoxygenation of the pyrolysis oil followed by combining the deoxygenated pyrolysis oil stream and the hydrocarbon stream prior to FCC processing. Such approaches add unit operations, along with added capital costs, to the upgrading process. Further, clogging of feed lines may still remain a concern even after deoxygenating the pyrolysis oils, and feed lines that facilitate introduction of a pyrolysis oil stream into a reaction zone where FCC processing is conducted are prone to clogging. Additionally, feed lines that contain mixtures of a hydrocarbon stream and a pyrolysis oil stream are also generally prone to clogging due to the presence of the pyrolysis oil stream in the feed lines. Simply separating and introducing the hydrocarbon stream and the pyrolysis oil stream into the reaction zone through separate feed lines is ineffective to avoid clogging.

Accordingly, it is desirable to provide methods and apparatuses that enable a mixture of a pyrolysis oil stream and a hydrocarbon stream to be upgraded through catalytic cracking, such as in fluid catalytic cracking units, while avoiding excessive clogging of feed lines. Furthermore, other desirable features and characteristics of the present invention will become apparent from the subsequent detailed description of the invention and the appended claims, taken in conjunction with the accompanying drawings and this background of the invention.

BRIEF SUMMARY

Methods and apparatuses for upgrading a pyrolysis oil stream and a hydrocarbon stream are provided herein. In an embodiment, a method for upgrading a pyrolysis oil stream and a hydrocarbon stream includes separately introducing the pyrolysis oil stream and the hydrocarbon stream into a reaction zone to form a mixture of the pyrolysis oil stream and the hydrocarbon stream in the reaction zone. The mixture of the pyrolysis oil stream and the hydrocarbon stream is catalytically cracked in the presence of a particulate cracking catalyst in the reaction zone. The pyrolysis oil stream is maintained at a temperature of less than or equal to about 100° C. substantially up to introduction into the reaction zone.

In another embodiment, a method for upgrading a pyrolysis oil stream and a hydrocarbon stream is conducted in a fluid catalytic cracking unit. The fluid catalytic cracking unit includes a reaction zone, and the method includes separately introducing the pyrolysis oil stream through a pyrolysis oil feed line and the hydrocarbon stream through a hydrocarbon feed line into the reaction zone to form a mixture of the pyrolysis oil stream and the hydrocarbon stream in the reaction zone. The pyrolysis oil feed line includes a pyrolysis oil outlet into the reaction zone and the hydrocarbon feed line includes a hydrocarbon outlet into the reaction zone. The mixture of the pyrolysis oil stream and the hydrocarbon stream is catalytically cracked in the presence of a particulate cracking catalyst in the reaction zone. The pyrolysis oil stream is maintained at a temperature of less than or equal to about 100° C. in the pyrolysis oil feed line substantially up to the pyrolysis oil outlet into the reaction zone.

In another embodiment, a fuel processing apparatus includes a pyrolysis reactor and a fluid catalytic cracking unit. The pyrolysis reactor pyrolyzes a biomass stream to produce a pyrolysis oil stream. The fluid catalytic cracking unit includes a reaction zone, a pyrolysis oil feed line, and a hydrocarbon feed line. Particulate cracking catalyst is contacted with a mixture of a hydrocarbon stream and the pyrolysis oil stream in the reaction zone. The pyrolysis oil feed line has a pyrolysis oil outlet into the reaction zone for introducing the pyrolysis oil stream into the reaction zone. The pyrolysis oil feed line is adapted to inhibit external heating of the pyrolysis oil stream through the pyrolysis oil feed line. The hydrocarbon feed line has a hydrocarbon outlet into the reaction zone for introducing the hydrocarbon stream into the reaction zone separate from the pyrolysis oil stream.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
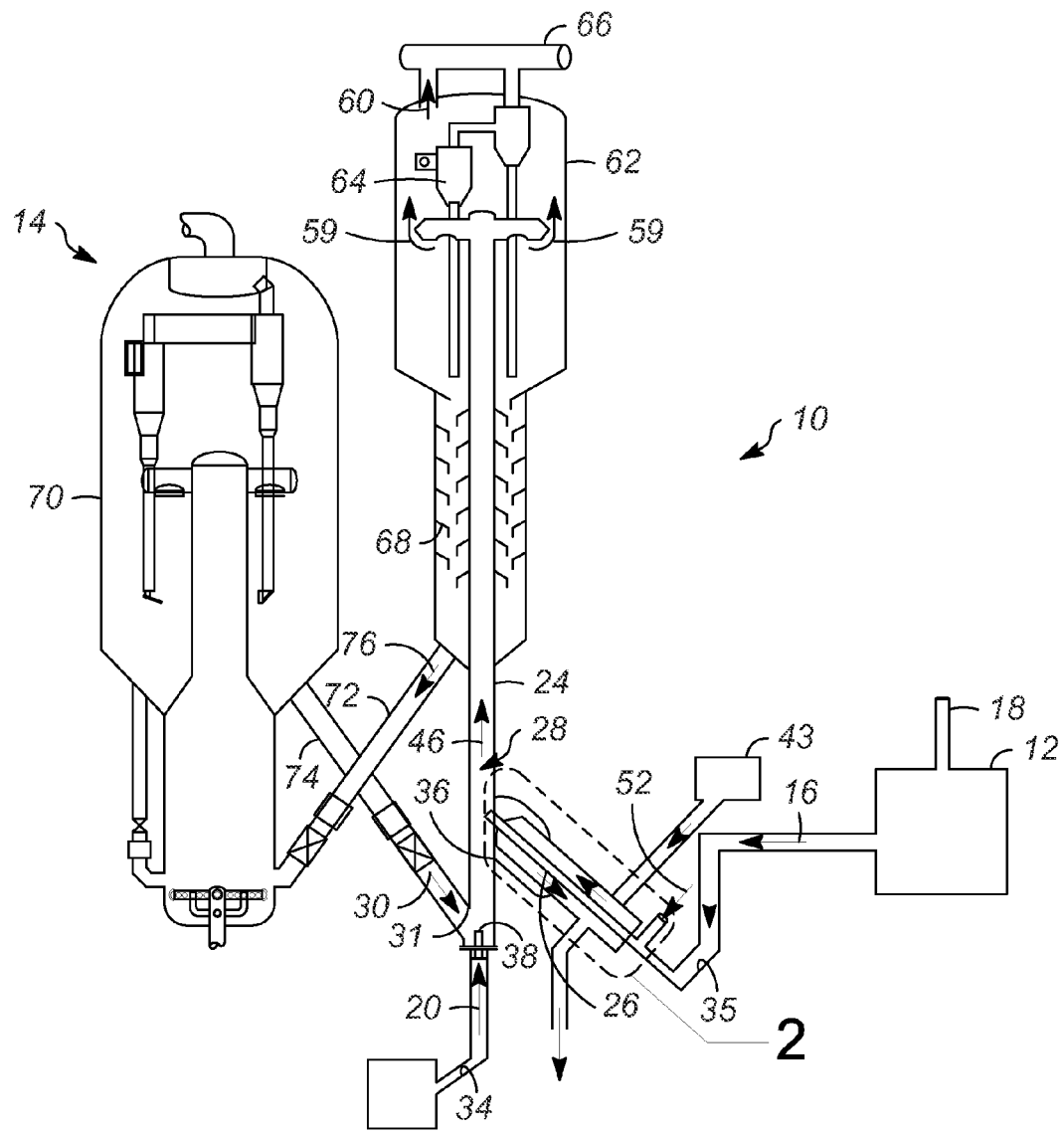
FIG. 1 is a schematic diagram of a fuel processing apparatus and a method for preparing upgraded pyrolysis oil in accordance with an exemplary embodiment.

The following detailed description is merely exemplary in nature and is not intended to limit the invention or the application and uses of the invention. Furthermore, there is no intention to be bound by any theory presented in the preceding background or the following detailed description.

Methods and fuel processing apparatuses for upgrading a pyrolysis oil stream and a hydrocarbon stream are provided herein. As referred to herein, "upgrading" refers to conversion of relatively high boiling point hydrocarbons to lower boiling point hydrocarbons. Upgrading processes generally render the hydrocarbon stream and the pyrolysis oil stream suitable for use as a transportation fuel. In the methods and fuel processing apparatuses described herein, a mixture of the pyrolysis oil stream and the hydrocarbon stream are catalytically cracked in a reaction zone in the presence of a particulate cracking catalyst. The reaction zone, as referred to herein, is an area or space where particulate cracking catalyst is comingled along with the pyrolysis oil stream and/or the hydrocarbon stream. Catalytic cracking is conducted at temperatures in excess of 100° C., and the hydrocarbon stream is generally provided at temperatures in excess of 100° C. However, pyrolysis oil generally polymerizes at temperatures in excess of about 100° C. and forms deposits within the apparatuses. Deposit formation is less of a concern in the reaction zone than in feed lines that lead to the reaction zone. In particular, deposit formation in the reaction zone generally results in deposited compounds forming on the particulate cracking catalyst. Because the particulate cracking catalyst may be regenerated through conventional processes even with high amounts of deposited compounds present thereon, operation of the fuel processing apparatuses is not materially affected by formation of deposited compounds on the particulate cracking catalyst. However, deposit formation in the feed lines that lead to the reaction zone may result in clogging, which requires shutdown of the fuel processing apparatuses and cleanout of the clogged feed lines. Therefore, to minimize deposit formation attributable to polymerization within the pyrolysis oil stream in the feed lines that lead to the reaction zone, the methods and fuel processing apparatuses that are described herein are adapted to minimize temperature rise of the pyrolysis oil stream until the pyrolysis oil stream is clear of structure upon which deposit formation could cause clogging.

To minimize the temperature rise of the pyrolysis oil stream in accordance with the methods and fuel processing apparatuses described herein, the pyrolysis oil stream and the hydrocarbon stream are separately introduced into the reaction zone, optionally in the presence of a carrier gas, and the temperature of the pyrolysis oil stream is maintained at a temperature of less than or equal to about 100° C. substantially up to introduction into the reaction zone. The temperature of the pyrolysis oil stream can be maintained in a variety of different ways as described in further detail below. Without being bound by any particular theory, it is believed that a temperature rise in the pyrolysis oil stream above about 100° C. results in excessive deposit formation due to polymerization within the pyrolysis oil stream. By maintaining the temperature of the pyrolysis oil stream at the temperature of less than or equal to about 100° C. substantially up to introduction into the reaction zone, deposit formation prior to introducing the pyrolysis oil stream into the reaction zone is minimized at least while the pyrolysis oil stream is in contact with structures within the fuel processing apparatuses outside of the reaction zone, where deposit formation could cause clogging.

An exemplary embodiment of a method for preparing upgraded pyrolysis oil will now be addressed with reference to an exemplary fuel processing apparatus 10 as shown in FIG. 1. In this embodiment, the fuel processing apparatus 10 includes a pyrolysis unit 12 and a fluid catalytic cracking (FCC) unit 14. The pyrolysis unit 12 provides a pyrolysis oil stream 16 by pyrolyzing a biomass stream 18 to produce the pyrolysis oil stream 16, such as through recently-developed fast pyrolysis. Fast pyrolysis is a process during which the biomass stream 18, such as wood waste, agricultural waste, biomass that is purposely grown and harvested for energy, and the like, is rapidly heated to about 450° C. to about 600° C. in the absence of air in the pyrolysis unit 12. Under these conditions, a pyrolysis vapor stream including organic vapors, water vapor, and pyrolysis gases is produced, along with char (which includes ash and combustible hydrocarbon solids). A portion of the pyrolysis vapor stream is condensed in a condensing system within the pyrolysis unit 12 to produce the pyrolysis oil stream 16. The pyrolysis oil stream 16 is a complex, organic liquid having an oxygen content, and may also contain water. For example, the oxygen content of the pyrolysis oil stream 16 can be from about 30 to about 60 weight %, such as from about 40 to about 55 weight %, based on the total weight of the pyrolysis oil stream 16. Water can be present in the pyrolysis oil stream 16 in an amount of from about 10 to about 35 weight %, such as from about 20 to about 32 weight %, based on the total weight of the pyrolysis oil stream 16. It is to be appreciated that in other embodiments, although not shown, the pyrolysis oil stream 16 may be provided from any source of pyrolysis oil such as a vessel that contains the pyrolysis oil stream 16, and the methods described herein are not limited to providing the pyrolysis oil stream 16 from any particular source. In an embodiment, the pyrolysis oil stream 16 is provided from the pyrolysis unit 12 at a temperature of less than or equal to about 100° C., such as less than or equal to about 80° C., to minimize polymerization of the pyrolysis oil stream 16 that could lead to deposit formation after leaving the pyrolysis unit 12.

In accordance with the exemplary method contemplated herein, a hydrocarbon stream 20 is also provided. As referred to herein, "hydrocarbon stream" refers to a petroleum-based source of hydrocarbons. The hydrocarbon stream 20 is provided separate from the pyrolysis oil stream 16, with the pyrolysis oil stream 16 and hydrocarbon stream 20 separately introduced into a reaction zone 28 as described in further detail below. The hydrocarbon stream 20 can include a fresh stream of hydrocarbons, or can include a refined stream of hydrocarbons from other refinement operations. In an embodiment, the hydrocarbon stream 20 is vacuum gas oil, which is a common hydrocarbon stream 20 that is upgraded in FCC units. It is to be appreciated that the hydrocarbon stream 20 may be provided from any source, and the methods described herein are not limited to providing the hydrocarbon stream 20 from any particular source. In embodiments, the hydrocarbon stream 20 is provided at a temperature that is higher than the pyrolysis oil stream 16, and is further introduced into the reaction zone 28 at a temperature that is higher than the pyrolysis oil stream 16, because little risk of deposit formation from the hydrocarbon stream 20 exists due to elevated temperatures and because elevated temperatures of the hydrocarbon stream 20 promote catalytic cracking. In an embodiment, the hydrocarbon stream 20 is provided at a temperature of at least 100° C., such as from about 100 to about 425° C., for example from about 200 to about 300° C.

Figure 2:
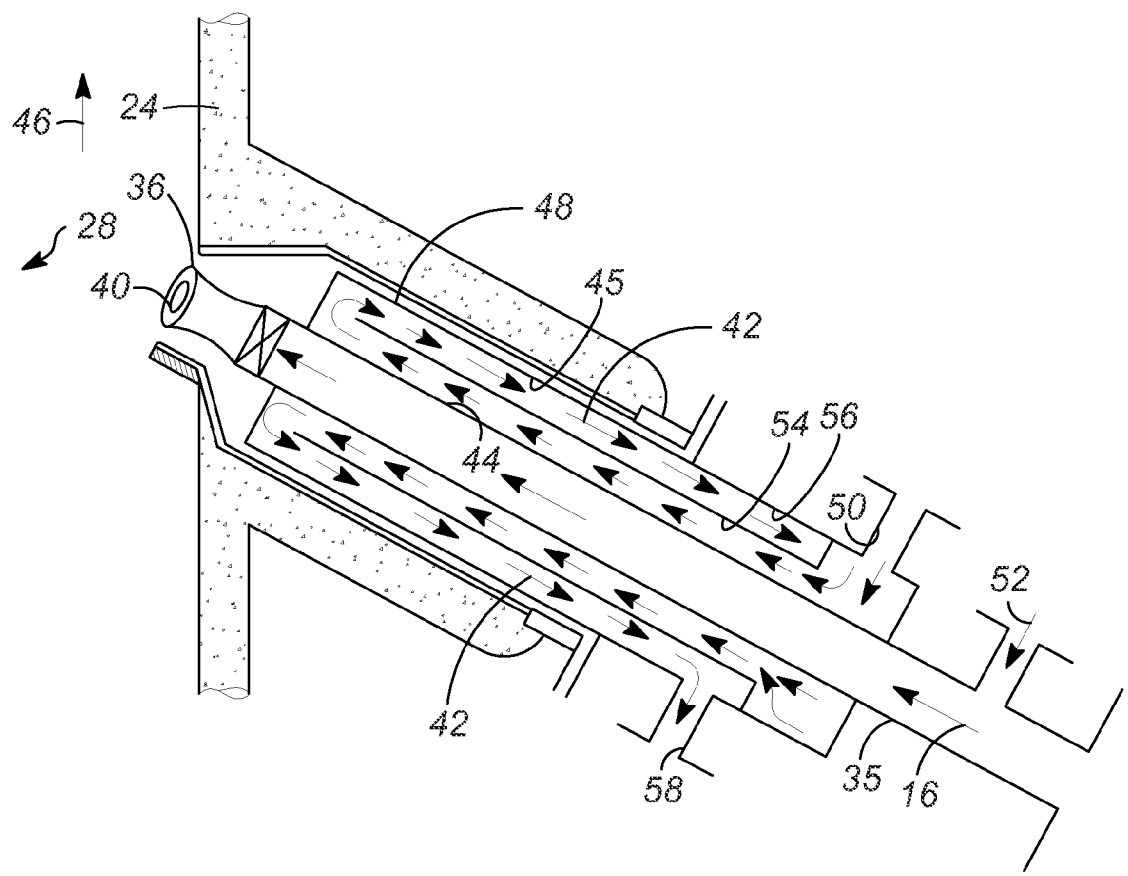
FIG. 2 is a schematic diagram of a portion of the schematic diagram of FIG. 1 showing an embodiment of a pyrolysis oil feed line in greater detail.

Referring to FIG. 1, an exemplary embodiment of the FCC unit 14 contemplated herein includes a reaction zone 28, a pyrolysis oil feed line 35, and a hydrocarbon feed line 34. In particular, a particulate cracking catalyst 30 is contacted with a mixture 46 of the hydrocarbon stream 20 and the pyrolysis oil stream 16 in the reaction zone 28. The pyrolysis oil feed line 35 has a pyrolysis oil outlet 36 into the reaction zone 28 for introducing the pyrolysis oil stream 16 into the reaction zone 28. In an embodiment and as shown in FIG. 2, the pyrolysis oil feed line 35 further includes a feed distribution tip 40 for spraying or atomizing the pyrolysis oil stream 16 into the reaction zone 28, and the pyrolysis oil outlet 36 is located at the feed distribution tip 40. The hydrocarbon feed line 34 has a hydrocarbon outlet 38 into the reaction zone 28 for introducing the hydrocarbon stream 20 into the reaction zone 28 separate from the pyrolysis oil stream 16. The exemplary method continues with separately introducing the pyrolysis oil stream 16 and the hydrocarbon stream 20 into the reaction zone 28 to form the mixture 46 of the pyrolysis oil stream 16 and the hydrocarbon stream 20 in the reaction zone 28.

By separately introducing the pyrolysis oil stream 16 and the hydrocarbon stream 20 into the reaction zone 28, a temperature rise of the pyrolysis oil stream 16 can be controlled and a temperature of the pyrolysis oil stream 16 can be maintained at less than or equal to about 100° C., such as less than or equal to about 80° C., substantially up to introduction into the reaction zone 28, e.g., substantially up to the pyrolysis oil outlet 36 into the reaction zone 28. In this regard, the pyrolysis oil feed line 35 is adapted to inhibit external heating of the pyrolysis oil stream 16 flowing through the pyrolysis oil feed line 35. As referred to herein, "substantially up to" refers to a location in the pyrolysis oil feed line 35 that is adjacent to the pyrolysis oil outlet 36 into the reaction zone 28 but upstream of the pyrolysis oil outlet 36 within the pyrolysis oil feed line 35, such as a closest location in the pyrolysis oil feed line 35 to the pyrolysis oil outlet 36 where insulation or active external cooling of the pyrolysis oil feed line 35 can be implemented. It is to be appreciated that a slight temperature rise above the aforementioned values is permissible, even prior to pyrolysis oil stream 16 passing through the pyrolysis oil outlet 36, so long as the temperature of the pyrolysis oil stream 16 is maintained at less than or equal to about 100° C. substantially up to introduction into the reaction zone 28. In an embodiment, the temperature of the pyrolysis oil stream 16 is maintained at less than or equal to about 100° C. by actively cooling the pyrolysis oil stream 16. Active cooling, as referred to herein, means that the pyrolysis oil stream 16 is cooled by a controllable cooling activity that enables a magnitude of cooling to be increased or decreased as opposed to insulating the pyrolysis oil stream 16 using insulation alone. In other embodiments, the pyrolysis oil stream 16 is provided, such as from the pyrolysis unit 12, at sufficiently low temperatures such that active cooling is unnecessary, and the pyrolysis oil feed line 35 is sufficiently insulated to maintain the temperature of the pyrolysis oil stream 16 at less than or equal to about 100° C. and avoid a temperature rise above 100° C. due to heat conduction from the reaction zone 28 into the pyrolysis oil feed line 35.

In embodiments, active cooling can be conducted by externally cooling the pyrolysis oil stream 16 with an external cooling medium 42 and/or internally cooling the pyrolysis oil stream 16 with a supplemental component 52 that is added to the pyrolysis oil stream 16. In an embodiment and as shown in FIG. 2, the pyrolysis oil stream 16 in the pyrolysis oil feed line 35 is externally cooled with the external cooling medium 42 that externally cools the pyrolysis oil feed line 35 to thereby inhibit external heating of the pyrolysis oil stream 16 through a wall 44 of the pyrolysis oil feed line 35. In this embodiment, the external cooling medium 42 is a cooling fluid 42 and can be a liquid or a gas. As an example, air, steam, and FCC product gas are examples of effective cooling fluids 42. The cooling fluid 42 contacts the wall 44 of the pyrolysis oil feed line 35, which buffers the pyrolysis oil feed line 35 from exposure to external heat. In an embodiment, as shown in FIGS. 1 and 2, a cooling jacket 48 that supports flow of the cooling fluid 42 is disposed about the pyrolysis oil feed line 35 to allow the cooling fluid 42 to contact the wall 44 of the pyrolysis oil feed line 35. Additionally, as shown in FIG. 2, the cooling fluid 42 contacts an exterior wall 45 of the cooling jacket 48 that may be directly exposed to the reaction zone 28 to thereby draw heat from gases that enter around the feed distribution tip 40 from the reaction zone 28, which heat may otherwise result in temperature rise of the pyrolysis oil stream 16 flowing through the pyrolysis oil feed line 35, thereby minimizing temperature rise of the pyrolysis oil stream 16 that may otherwise occur. The cooling jacket 48 includes a cooling fluid inlet 50, an internal flow channel 54 that is disposed adjacent to the wall 44 of the pyrolysis oil feed line 35, an external flow channel 56 that is spaced from the wall 44 of the pyrolysis oil feed line 35 on an opposite side of the internal flow channel 54 from the pyrolysis oil feed line 35, and a cooling fluid outlet 58. The cooling fluid inlet 50 supports flow of the cooling fluid 42 into the cooling jacket 48 from a cooling fluid source 43, such as an air compressor, as shown in FIG. 1. Once in the cooling jacket 48, the cooling fluid 42 flows through the internal flow channel 54, in contact with the wall 44 of the pyrolysis oil feed line 35. In an embodiment and as shown in FIG. 2, the internal flow channel 54 extends substantially up to the pyrolysis oil outlet 36 into the reaction zone 28, where the cooling fluid 42 then enters the external flow channel 56, followed by conveying the cooling fluid 42 out of the cooling jacket 48 through the cooling fluid outlet 58. In this embodiment, although not shown, the cooling fluid 42 can be processed in a closed loop, with the cooling fluid 42 that exits through the cooling fluid outlet 58 then cooled and returned to the cooling fluid inlet 50 of the cooling jacket 48. In an alternative embodiment, although not shown, the cooling fluid outlet 58 of the cooling jacket 48 may be disposed adjacent to the pyrolysis oil outlet 36, and the cooling fluid 42 may be discharged into the reaction zone 28 along with the pyrolysis oil stream 16. In this embodiment, the external flow channel 56 is absent from the cooling jacket 48. Also in this embodiment, the cooling fluid 42 may be steam or FCC product gas to avoid potential effects of oxygen present in air on the catalytic cracking reaction in the reaction zone 28. Specific process parameters such as flow rates of the cooling fluid 42, inlet temperature of the cooling fluid 42, contact surface area between the wall 44 of the pyrolysis oil feed line 35 and the cooling fluid 42, contact surface area between the cooling fluid 42 and the exterior wall 45 of the cooling jacket 48, cooling fluid composition, and other considerations that pertain to maintaining the pyrolysis oil stream 16 at the temperature of less than or equal to about 100° C. substantially up to introduction into the reaction zone 28 are design considerations that can be readily determined by those of skill in the art.

In another embodiment, as alluded to above, the pyrolysis oil stream 16 is internally cooled with the supplemental component 52 that is added to the pyrolysis oil stream 16. The pyrolysis oil stream 16 can be internally cooled in combination with externally cooling the pyrolysis oil stream 16 to maintain the pyrolysis oil stream 16 at the temperature of less than or equal to about 100° C. substantially up to introduction into the reaction zone 28. In an embodiment, the pyrolysis oil stream 16 is internally cooled by adding the supplemental component 52 to the pyrolysis oil stream 16 that is flowing through the pyrolysis oil feed line 35. The supplemental component 52 can be, for example, a carrier gas 52 that is added to the pyrolysis oil stream 16 to assist with introducing the pyrolysis oil stream 16 into the reaction zone 28. In this embodiment, the carrier gas 52 and the pyrolysis oil stream 16 are mixed prior to introducing the pyrolysis oil stream 16 into the reaction zone 28 to also internally cool the pyrolysis oil stream 16. The carrier gas 52 may be FCC product gas, steam, and/or an inert gas such as nitrogen. To cool the pyrolysis oil stream 16 with the supplemental component 52, the supplemental component 52 is provided at a temperature of less than or equal to about 100° C., such as less than or equal to about 80° C., or such as lower than about 10° C. Because carrier gas 52 is employed in relatively small amounts compared to the pyrolysis oil stream 16, under conditions in which the pyrolysis oil stream 16 is internally cooled with the carrier gas 52, the carrier gas 52 can be provided at temperatures that are substantially lower than 10° C., depending upon the particular type of carrier gas that is employed to effectuate cooling.

In accordance with an exemplary embodiment of the method contemplated herein, the pyrolysis oil stream 16 produced from pyrolyzing the biomass stream 18 is introduced into the reaction zone 28 in the absence of intervening upgrading processing of the pyrolysis oil stream 16. Intervening upgrading processes include, but are not limited to, deoxygenation, cracking, hydrotreating, and the like. In an embodiment, the pyrolysis oil stream 16 is provided directly as a condensed product stream from the pyrolysis unit 12.

Although the methods described herein are effective for minimizing deposit formation from the pyrolysis oil stream 16 prior to introducing the pyrolysis oil stream 16 into the reaction zone 28, independent of a ratio of the pyrolysis oil stream 16 to the hydrocarbon stream 20, excessive deposit formation on the particulate cracking catalyst 30 may be avoided by adjusting the ratio at which the pyrolysis oil stream 16 and the hydrocarbon stream 20 are mixed. In an embodiment, the pyrolysis oil stream 16 and the hydrocarbon stream 20 are mixed at a weight ratio of the pyrolysis oil stream 16 to the hydrocarbon stream 20 of from about 0.005:1 to about 0.2:1, such as from about 0.01:1 to about 0.05:1. Within the aforementioned weight ratios, the pyrolysis oil stream 16 is sufficiently dilute within the mixture 46 of the pyrolysis oil stream 16 and the hydrocarbon stream 20 to avoid excessive deposit formation on the particulate cracking catalyst 30, thereby avoiding impact on catalyst activity and selectivity of the particulate cracking catalyst 30 within the fluid catalytic cracking unit 14 or excessive heat generation in the catalyst regenerator 70.

The exemplary method continues with catalytically cracking the mixture 46 of the pyrolysis oil stream 16 and the hydrocarbon stream 20 in the presence of the particulate cracking catalyst 30. In this regard, the particulate cracking catalyst 30 can first comingle with one of the hydrocarbon stream 20 or the pyrolysis oil stream 16 before mixing the other of the hydrocarbon stream 20 or the pyrolysis oil stream 16. Because the particulate cracking catalyst 30 is generally introduced into the reaction zone 28 at a temperature that is sufficient to facilitate catalytic cracking of the mixture 46 of the pyrolysis oil stream 16 and the hydrocarbon stream 20, catalytic cracking generally commences when the particulate cracking catalyst 30 is comingled with the hydrocarbon stream 20 and/or the pyrolysis oil stream 16.

In an exemplary embodiment and as shown in FIG. 1, the reaction zone 28 of the FCC unit 14 is included in a vertical conduit or riser 24. In an embodiment, catalytically cracking the mixture 46 of the pyrolysis oil stream 16 and the hydrocarbon stream 20 includes comingling the particulate cracking catalyst 30 and the pyrolysis oil stream 16 and/or the hydrocarbon stream 20 in the reaction zone 28. For example, in an embodiment and as shown in FIG. 1, the hydrocarbon stream 20 is introduced into the riser 24 from the hydrocarbon outlet 38 with the hydrocarbon outlet 38 located upstream of the pyrolysis oil outlet 36. In this embodiment, the particulate cracking catalyst 30 may be introduced into the reaction zone 28 at a catalyst outlet 31 that is downstream of the hydrocarbon outlet 38 but upstream of the pyrolysis oil outlet 36, resulting in the particulate cracking catalyst 30 first comingling with the hydrocarbon stream 20 before introducing the pyrolysis oil stream 16 into the reaction zone 28. Such configuration of the hydrocarbon outlet 38, the catalyst outlet 31, and the pyrolysis oil outlet 36 may enable reaction temperatures within the reaction zone 28 to be expediently optimized before introducing the relatively cool pyrolysis oil stream 16 into the reaction zone 28. However, it is to be appreciated that the methods described herein are not particularly limited to the relative locations of the hydrocarbon outlet 38, the catalyst outlet 31, and the pyrolysis oil outlet 36 and that any relative location of the hydrocarbon outlet 38, the catalyst outlet 31, and the pyrolysis oil outlet 36, whether upstream, downstream, or at evenstream from each other, is feasible in accordance with the methods described herein. In an embodiment and as shown in FIG. 2, the pyrolysis oil stream 16 is introduced into the reaction zone 28 at an angle toward a direction of flow within the riser 24 to minimize contact of the pyrolysis oil stream 16 with a wall of the riser 24 that is opposite to the pyrolysis oil outlet 36, thereby minimizing deposit formation on the wall of the riser 24 that is attributable to the pyrolysis oil stream 16. The residence time of the particulate cracking catalyst 30 and the mixture 46 of the pyrolysis oil stream 16 and the hydrocarbon stream 20 in the riser 24 is generally only a few seconds. General operating conditions for the reaction zone 28 in FCC units are known in the art.

Catalytic cracking of the mixture 46 of the pyrolysis oil stream 16 and the hydrocarbon stream 20 produces an effluent 59 that includes spent particulate cracking catalyst 76 and a gaseous component 60. The gaseous component 60 includes products from the reaction in the reaction zone 28 such as cracked hydrocarbons, and the cracked hydrocarbons may be condensed to obtain upgraded fuel products that have a range of boiling points. Examples of upgraded fuel products include, but are not limited to, propane, butane, naphtha, light cycle oil, and heavy fuel oil. In accordance with an embodiment of the contemplated method, the spent particulate cracking catalyst 76 and the gaseous component 60 are separated. In this embodiment, and as shown in FIG. 1, the FCC unit 14 further includes a separator vessel 62 that is in fluid communication with the reaction zone 28. The separator vessel 62 separates the spent particulate cracking catalyst 76 from the effluent 59. The separator vessel 62 may include a solids-vapor separation device 64, which is normally located within and at the top of the separator vessel 62. The gaseous component 60 of the effluent 59 is separated from the spent particulate cracking catalyst 76 in the separator vessel 62, and the gaseous component 60 may be vented from the separator vessel 62 via a product line 66. Although not shown, the gaseous component 60 may be compressed to obtain the upgraded fuel products, and FCC product gas that is not condensed may be recycled for use as the cooling fluid 42 and/or the carrier gas 52 in embodiments. In an embodiment, the spent particulate cracking catalyst 76 falls downward to a stripper 68 that is located in a lower part of the separator vessel 62. The stripper 68 assists with removing deposited compounds from the spent particulate cracking catalyst 76 prior to further catalyst regeneration.

In an embodiment, the FCC unit 14 further includes a catalyst regenerator 70 that is in fluid communication with the separator vessel 62 and that is also in fluid communication with the reaction zone 28. The spent particulate cracking catalyst 76 that is separated from the gaseous component 60 is introduced into the catalyst regenerator 70 from the stripper 68, and deposited compounds are removed from the spent particulate cracking catalyst 76 in the catalyst regenerator 70 by contacting the spent particulate cracking catalyst 76 with oxygen-containing regeneration gas. In one embodiment, the spent particulate cracking catalyst 76 is transferred to the catalyst regenerator 70 by way of a first transfer line 72 connected between the catalyst regenerator 70 and the stripper 68. Furthermore, the catalyst regenerator 70, being in fluid communication with the reaction zone 28, passes regenerated particulate catalyst 30 to the reaction zone 28. In the FCC unit 14 as illustrated in FIG. 1, the particulate cracking catalyst 30 is continuously circulated from the reaction zone 28 to the catalyst regenerator 70 and then again to the reaction zone 28, such as through a second transfer line 74.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for upgrading a pyrolysis oil stream and a hydrocarbon stream, the method comprising the steps of:
   separately introducing the pyrolysis oil stream and the hydrocarbon stream into a reaction zone to form a mixture of the pyrolysis oil stream and the hydrocarbon stream in the reaction zone, wherein the pyrolysis oil stream consists essentially of pyrolysis oil and up to 35 wt % water;
   catalytically cracking the mixture of the pyrolysis oil stream and the hydrocarbon stream in the presence of a particulate cracking catalyst in the reaction zone; and
   actively cooling and maintaining the pyrolysis oil stream at a temperature of less than or equal to about 80° C. substantially up to introduction into the reaction zone, wherein actively cooling and maintaining the pyrolysis oil stream comprises externally cooling the pyrolysis oil stream with an external cooling medium.

2. The method of claim 1, wherein actively cooling and maintaining the pyrolysis oil stream is to a temperature of less than or equal to about 10° C.

3. The method of claim 1, wherein the pyrolysis oil stream is actively cooled substantially up to introducing the pyrolysis oil stream into the reaction zone.

4. The method of claim 1, wherein actively cooling the pyrolysis oil stream further comprises internally cooling the pyrolysis oil stream with a supplemental component added to the pyrolysis oil stream.

5. The method of claim 4, wherein a carrier gas is the supplemental component added to the pyrolysis oil stream, and wherein internally cooling the pyrolysis oil stream comprises mixing the carrier gas and the pyrolysis oil stream prior to introducing the pyrolysis oil stream into the reaction zone.

6. The method of claim 1, wherein the hydrocarbon stream is introduced into the reaction zone at a temperature higher than the pyrolysis oil stream.

7. The method of claim 1, wherein the hydrocarbon stream is introduced into the reaction zone upstream of the pyrolysis oil stream.

8. The method of claim 1, further comprising pyrolyzing a biomass stream to produce the pyrolysis oil stream.

9. The method of claim 8, wherein the pyrolysis oil stream produced from pyrolyzing the biomass stream is introduced into the reaction zone in the absence of intervening upgrading processing of the pyrolysis oil stream.

10. The method of claim 1, wherein the pyrolysis oil stream and the hydrocarbon stream are mixed at a weight ratio of the pyrolysis oil stream to the hydrocarbon stream of from about 0.005:1 to about 0.2:1.

11. The method of claim 1, wherein the pyrolysis oil stream is introduced by injecting the pyrolysis oil stream into the reaction zone through an injector.

12. A method for upgrading a pyrolysis oil stream and a hydrocarbon stream in a fluid catalytic cracking unit including a reaction zone, the method comprising the steps of:
   separately introducing the pyrolysis oil stream through a pyrolysis oil feed line and the hydrocarbon stream through a hydrocarbon feed line into a reaction zone to form a mixture of the pyrolysis oil stream and the hydrocarbon stream in the reaction zone, wherein the pyrolysis oil feed line includes a pyrolysis oil outlet into the reaction zone and the hydrocarbon feed line includes a hydrocarbon outlet into the reaction zone wherein the pyrolysis oil stream consists essentially of pyrolysis oil up to 35 wt % water;
   catalytically cracking the mixture of the pyrolysis oil stream and the hydrocarbon stream in the presence of a particulate cracking catalyst in the reaction zone;
   actively cooling and maintaining the pyrolysis oil stream at a temperature of less than or equal to about 80° C. in the pyrolysis oil feed line substantially up to the pyrolysis oil outlet into the reaction zone, wherein actively cooling and maintaining the pyrolysis oil stream comprises externally cooling the pyrolysis oil stream in the pyrolysis oil feed line with an external cooling medium that externally cools the pyrolysis oil feed line to thereby inhibit external heating of the pyrolysis oil stream through the pyrolysis oil feed line.

13. The method of claim 12, wherein actively cooling and maintaining the pyrolysis oil stream is to a temperature of less than or equal to about 10° C.

14. The method of claim 12, wherein the pyrolysis oil stream is actively cooled substantially up to the pyrolysis oil outlet into the reaction zone.

15. The method of claim 12, wherein actively cooling the pyrolysis oil stream further comprises internally cooling the pyrolysis oil stream with a supplemental component added to the pyrolysis oil stream flowing through the pyrolysis oil feed line.

16. The method of claim 12, wherein the hydrocarbon outlet into the reaction zone is upstream of the pyrolysis oil outlet into the reaction zone.

17. The method of claim 12, further comprising pyrolyzing a biomass stream in a pyrolysis unit to form the pyrolysis oil stream, and wherein the pyrolysis oil stream produced from pyrolyzing the biomass stream is introduced into the reaction zone in the absence of intervening upgrading processing of the pyrolysis oil stream.

18. The method of claim 12, wherein the fluid catalytic cracking unit further comprises a separator vessel in fluid communication with the reaction zone, wherein catalytically cracking the mixture of the pyrolysis oil stream and the hydrocarbon stream produces an effluent comprising spent particulate cracking catalyst and a gaseous component, and wherein the gaseous component is separated from the spent particulate cracking catalyst in the separator vessel.

19. The method of claim 12, wherein the pyrolysis oil outlet comprises an injector, and wherein the pyrolysis oil stream is introduced by injecting the pyrolysis oil stream into the reaction zone through the injector.

* * * * *